Dec. 19, 1944. C. S. SHAW 2,365,496
MOISTURE MEASURING INSTRUMENT
Filed Oct. 19, 1943 2 Sheets-Sheet 1
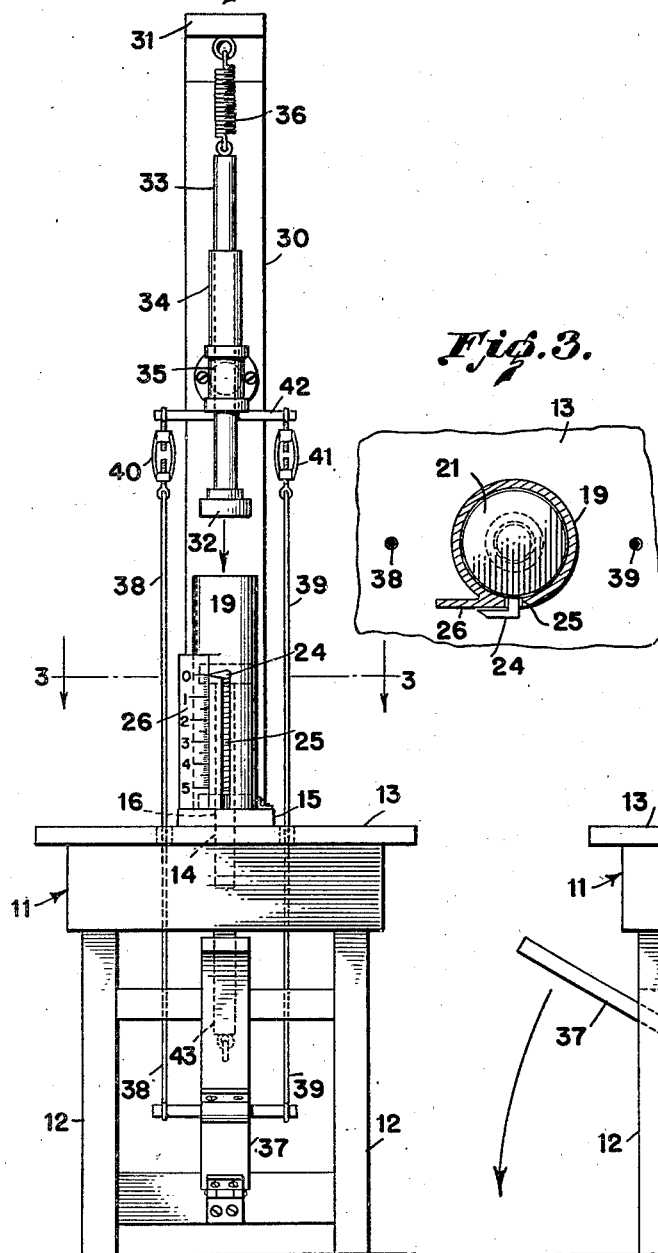
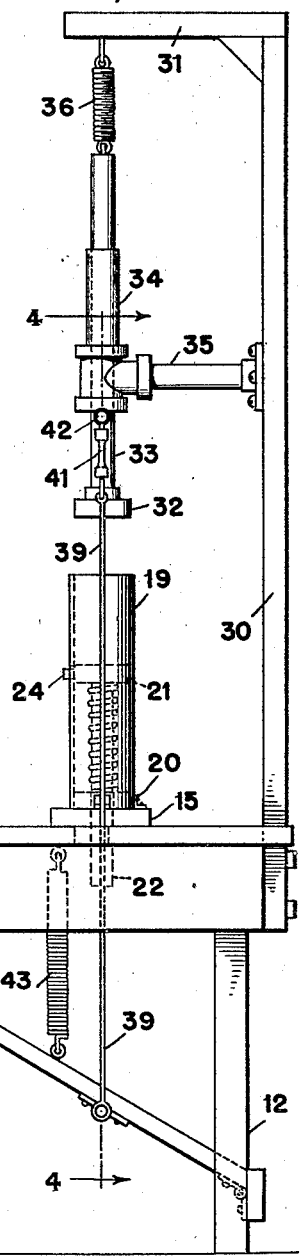
INVENTOR
C.S. SHAW

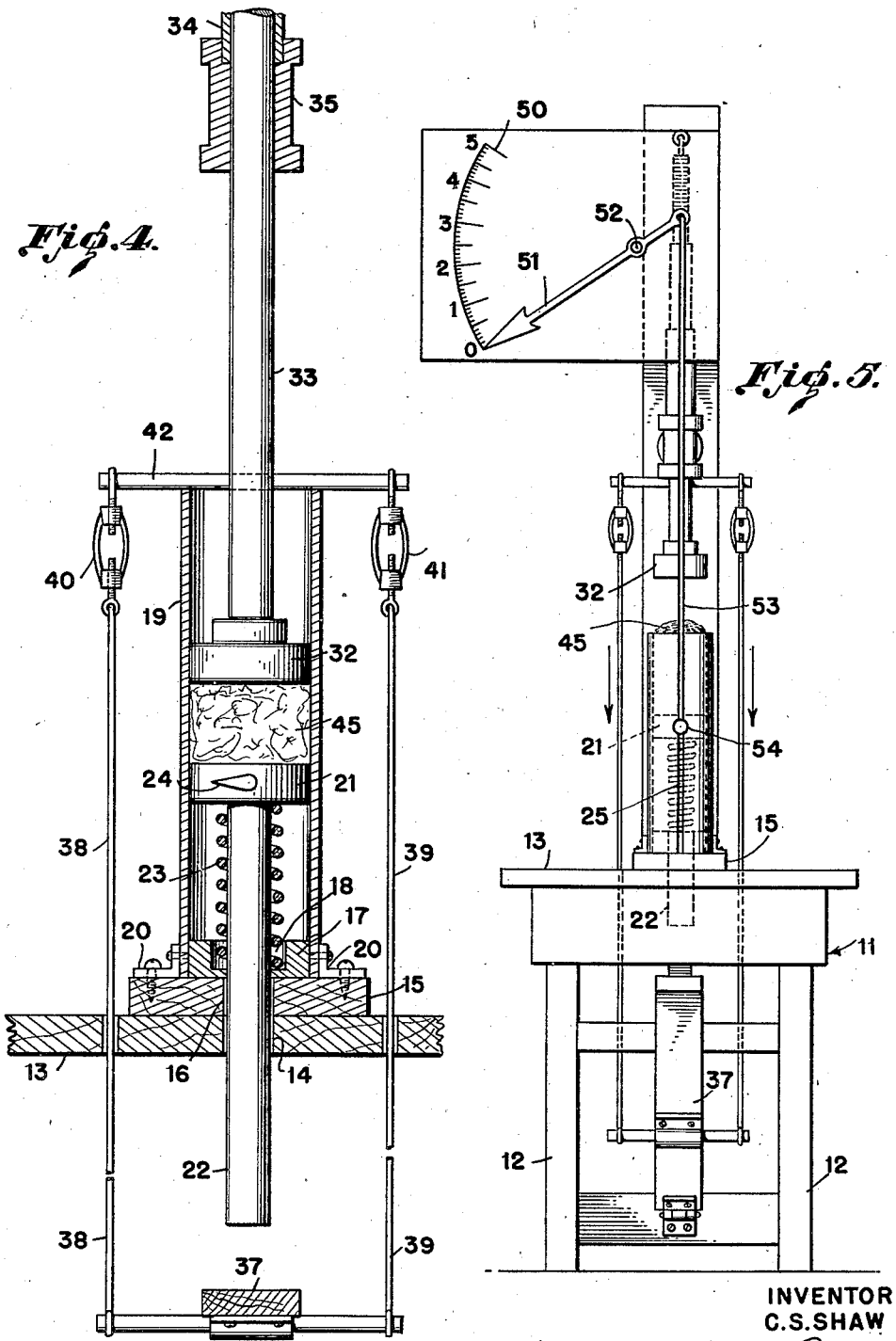

Patented Dec. 19, 1944

2,365,496

UNITED STATES PATENT OFFICE 2,365,496

MOISTURE-MEASURING INSTRUMENT

Charles S. Shaw, Leland, Miss., assignor to United States of America, as represented by the Secretary of Agriculture Application October 19, 1943, Serial No. 506,835

2 Claims. (Cl. 73—73)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

This invention relates to an instrument and a method for determining the moisture content of resilient hygroscopic fibrous materials, such as lint cotton.

According to the customary laboratory practice, moisture content of a sample is determined by weighing the sample, drying, reweighing the dried sample, and computing the moisture content from the weights thus obtained. This invention eliminates the necessity for this tedious procedure, and has among its objects the provision of a device for directly determining the moisture content of a sample in a simple and expeditious manner; the provision of such a device which is of simple construction, and which can be readily assembled and disassembled from a few easily obtained or constructed parts; and the provision of a method for measuring the moisture content based on the property of coherent fluffy masses of filamentary hygroscopic fibrous organic materials, such as cotton fiber, of altering the degree of pressure exerted by the mass when in a compressed state, with variation of its absorbed moisture content.

When cotton fiber or a similar material is compressed, the pressure exerted by the material varies with its absorbed moisture content, the greater moisture content resulting in lesser pressure. The present invention utilizes this phenomenon as the basis for measuring the absorbed moisture content of a sample of such material, and in general comprises a device which will measure the pressure exerted by the sample when pressure is applied to it while confined to unidirectional displacement, such measurement giving an index from which the absorbed moisture content can be determined directly.

In the following description of the invention, reference is made to the accompanying drawings, in which:

Figure 1 is a front elevation of the instrument;
Figure 2 is a side elevation thereof;
Figure 3 is a section on the line 3—3 of Figure 1;
Figure 4 is a section on the line 4—4 of Figure 2; and
Figure 5 is a view corresponding to Figure 1, but showing a modified detail.

In reference to the embodiment shown in Figures 1 through 4, a stand 11, which may be of wooden construction, has supporting legs 12 and a top 13 provided with an aperture 14 near its center.

Means for indicating the pressure exerted by a sample when in its compressed state is mounted on the stand. A base-block 15 having an aperture 16 is mounted on the top 13 with its aperture in alignment with aperture 14. A circular block 17 provided with a central countersunk aperture 18 is mounted on the base-block with its aperture aligning with apertures 14 and 16, and an upright, rigid wall, metal cylinder 19 having an open end at its top and a polished inside surface is detachably mounted by means of clips 20 with its lower end surrounding the circular block 17.

A circular follow-block 21, having substantially the same cross-sectional area as the inside of the cylinder, is mounted for free longitudinal movement inside the cylinder on a follow-block guide rod 22 extending downwardly through apertures 14, 16, and 18, and is movable downwardly against the action of a coil compression spring 23 which surrounds the guide rod 22 and engages the follow-block 21 and the circular block 17 at its upper and lower ends, respectively. The lower end of the spring is seated in the countersunk aperture 18.

The circular follow-block has indicator means movable therewith, such as a pointer 24 secured to the follow-block and projecting through a longitudinally extending slot 25 in the wall of cylinder 19 for traversing the pressure scale 26 secured adjacent to the slot. Thus, if a sample is compressed against the follow-block 21 within the cylinder, the pressure exerted by the sample will cause a compression of spring 23 and will be indicated by movement of pointer 24 on scale 26 giving an index of the moisture content of the sample.

Means for applying pressure to the sample to compress it within the cylinder is also mounted on the stand by means of a support bracket having a vertical stud 30 and horizontal arm 31 positioned over the stand. A pressure-block 32, having substantially the same cross-sectional area as the inside of the cylinder and mounted to move downwardly into the open end of the cylinder, is attached to the lower end of a tail-rod 33 slidably mounted in a sleeve 34 carried by bracket 35 attached to the stud 30. The pressure-block and tail-rod are moved upwardly by tension spring 36 attaching the upper end of the tail-rod to horizontal arm 31.

Downward movement of the pressure-block is imparted by a foot lever 37 pivotally attached at one end to the rear pair of supporting legs 12 of the stand and with its other end in a convenient location to be moved by the operator. Tie cables 38 and 39 connect the lever through turn buckles 40 and 41 to a cross-head 42 attached below the sleeve 34 to the tail-rod 33. A tension spring 43 attached between the foot lever and the stand top works in unison with tension spring 36 normally to hold the foot-lever in its raised position.

The pressure-block is limited in its upward and downward movement by crosshead 42, which serves as a stop to engage with sleeve 34 and the upper end of the cylinder 19, respectively.

In use, samples are placed in the cylinder as indicated at 45 (Figure 4), are compressed by downward movement of the foot lever until the crosshead strikes the top of the cylinder, and the movement of the follow-block and consequent pressure exerted by the sample are read on scale 26, the instrument being first calibrated. Calibration is accomplished by testing a number of known samples, each having a definite unit weight, of the same type material and of varying moisture contents, and by plotting on a calibration chart the readings from scale 26 against the moisture contents of the various samples.

To determine the moisture content of an unknown sample of the same type material, all that is necessary is to place the same definite unit weight of the material for which the instrument is calibrated into the cylinder, press the foot lever until the crossrod strikes the cylinder, take the scale reading, and by reference to the calibration chart pick out the correct moisture content reading.

Of course, if the instrument is to be used for testing only one type of material, the moisture content calibrations can be written directly on scale 26, or for a few types they may be written side by side on the scale.

The embodiment illustrated in Figure 5 is similar in all details to that heretofore described, except as to the scale, and only the modified features will be described in detail.

In Figure 5, a circular moisture content indicating scale 50, mounted near the top of the instrument, is traversed by pointer 51 pivotally mounted at 52. The pointer is connected by tie-rod 53 to a pin 54, which operates in slot 25 of the cylinder and is connected to the follow-block 21. Due to location of pivot 52, this arrangement gives an amplified reading of the scale; also, the position of the scale is more convenient for the operator to take the readings.

Having thus described the invention, what is claimed is:

1. An instrument for measuring the absorbed moisture content of a sample of resilient hygroscopic fibrous substance comprising: a stand, an upright rigid wall cylinder having an open top and mounted on the strand, a compression spring in the cylinder, a follow-block mounted within the cylinder in engagement with the spring and freely movable downwardly against its action, a pointer movable with the follow-block, a scale traversed by the pointer, a pressure-block mounted to move downwardly into the open end of the cylinder, said follow-block and pressure-block having substantially the same cross-sectional areas as the inside of the cylinder, a stop movable with the pressure-block and engaging the upper end of the cylinder to limit downward movement of the pressure block into the cylinder, and means for moving the pressure-block into the cylinder to apply pressure to a definite unit weight of a sample of the substance when placed in the cylinder on the follow-block, whereby the moisture content of the sample may be determined by comparing the pressure exerted by it when compressed to that of the same definite unit weight of a known moisture-content sample of a similar substance when compressed under like circumstances.

2. An instrument for measuring the absorbed moisture content of a sample of resilient hygroscopic fibrous substance comprising: an open-end, rigid wall cylinder, a follow-block mounted within the cylinder and freely movable away from the open end of the cylinder, a spring against which the follow-block is movable, a pressure-block movable into the open end of the cylinder a limited distance, said follow-block and pressure block having substantially the same cross-sectional areas as the inside of the cylinder, whereby a sample of the substance may be placed in the cylinder and pressure applied to it by movement of the pressure-block its limited distance and pressure of the sample will cause movement of the follow-block, a scale, and means movable with the follow-block and movable relative to the scale for indicating the extent of movement of the follow-block to give a reading from which the moisture content of the sample is determinable.

CHARLES S. SHAW.